(12) United States Patent
Nurmi

(10) Patent No.: US 8,751,838 B2
(45) Date of Patent: Jun. 10, 2014

(54) METHOD, APPARATUS AND COMPUTER PROGRAM PRODUCT FOR PRESENTATION OF INFORMATION IN A LOW POWER MODE

(75) Inventor: Mikko Antero Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 665 days.

(21) Appl. No.: 12/861,562

(22) Filed: Aug. 23, 2010

(65) Prior Publication Data

US 2012/0047380 A1 Feb. 23, 2012

(51) Int. Cl.
*G06F 1/32* (2006.01)
(52) U.S. Cl.
USPC ............................ 713/320; 455/566; 715/867
(58) Field of Classification Search
USPC ............................ 455/566; 715/867; 713/320
See application file for complete search history.

(56) References Cited

U.S. PATENT DOCUMENTS

| 5,394,166 | A | 2/1995 | Shimada | |
|---|---|---|---|---|
| 7,113,809 | B2 * | 9/2006 | Noesgaard et al. | 455/566 |
| 2007/0046618 | A1 | 3/2007 | Imai | |
| 2008/0134063 | A1 * | 6/2008 | Volach | 715/762 |
| 2008/0141049 | A1 | 6/2008 | Hassan et al. | |

FOREIGN PATENT DOCUMENTS

| CN | 1805458 | 7/2006 |
|---|---|---|
| EP | 1 056 261 A2 | 11/2000 |
| EP | 1 178 650 A2 | 2/2002 |
| EP | 1 367 559 A2 | 12/2003 |
| GB | 2325821 | 12/1998 |
| TW | 2007 29137 A | 8/2007 |
| WO | WO 2007/026046 A1 | 3/2007 |

OTHER PUBLICATIONS

International Search Report and Written Opinion for Application No. PCT/IB2011/053700 dated Nov. 21, 2011.
Office Action for European Application No. 11 819 449.2 dated Jan. 31, 2014.

* cited by examiner

*Primary Examiner* — Albert Wang
(74) *Attorney, Agent, or Firm* — Alston & Bird LLP

(57) ABSTRACT

Provided herein is a method, apparatus, and computer program product for presenting information on a display to a user when the display is operating in a low, or reduced power mode. In particular, the method includes providing for operation in a user interface state that is configured to present a first amount of information with at least a portion of the first amount of information being presented on a display while operating in a first power mode, selecting information from the first amount of information to create a second amount of information that is a subset of the first amount of information, where the second amount of information is selected from the first amount of information based upon relevancy parameters, and providing for display of a second amount of information from the user interface state while operating in a second power mode.

14 Claims, 6 Drawing Sheets

METHOD, APPARATUS AND COMPUTER PROGRAM PRODUCT FOR PRESENTATION OF INFORMATION IN A LOW POWER MODE

TECHNOLOGICAL FIELD

Example embodiments of the present invention relate generally to the presentation of information on a display, and more particularly, to the presentation of selected information on a display when the display is operating in a low power mode.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications, some of which benefit from a larger display. The displays of mobile devices have become increasingly large such that they may now usurp surface space that may have previously been used for a traditional tactile keypad such that some mobile devices may flip open to present a keypad or the display may also serve as a touch-screen user interface. One negative aspect of large displays is the power consumption requirement to present the vast amounts of information available through mobile devices. As mobile devices are intended to be portable, a smaller size is generally preferable which may limit the size of battery that can be used with the mobile device. A display such as a liquid crystal display (LCD), a light emitting diode (LED) display, or an organic light emitting diode (OLED) display may consume the battery power of a mobile device relatively quickly if the display remains on for long periods. As such, many devices use a "sleep" mode or a low power consumption mode to revert to when the mobile device is not actively being used.

SUMMARY

In general, an example embodiment of the present invention provides an improved method of presenting information on a display to a user when the display is operating in a low, or reduced power mode.

In particular, the method of example embodiments includes providing for operation in a user interface state that is configured to present a first amount of information with at least a portion of the first amount of information being presented on a display while operating in a first power mode, selecting information from the first amount of information to create a second amount of information that is a subset of the first amount of information, where the second amount of information is selected from the first amount of information based upon relevancy parameters, and providing for display of a second amount of information from the user interface state while operating in a second power mode. The second power mode may be configured to consume less power than the first power mode. The relevancy parameters may be configured by a user. The relevancy parameters may also vary depending upon the user interface state. Operation in the second power mode may be initiated by a predetermined amount of time elapsing without detection of a user input. A third amount of information from the user interface state may be displayed while operating in a third power mode. The third amount of information may be a subset of the second amount of information where the third amount of information is selected from the second amount of information based upon relevancy parameters.

According to another embodiment of the present invention, an apparatus is provided. The apparatus may include at least one processor and at least one memory including computer program code. The at least one memory and the computer program code may be configured to, with the at least one processor, cause the apparatus to provide for operation in a user interface state that is configured to present a first amount of information with at least a portion of the first amount of information being presented on a display while operating in a first power mode, provide for selection of information from the first amount of information to create a second amount of information that is a subset of the first amount of information, where the second amount of information is selected from the first amount of information based upon relevancy parameters, and provide for display of a second amount of information from the user interface state while operating in a second power mode. The second power mode may be configured to consume less power than the first power mode. The relevancy parameters may be configured by a user and the relevancy parameters may vary depending upon the user interface state. Operation in the second power mode may be caused by a predetermined amount of time elapsing without detection of a user input. A third amount of information from the user interface state may be displayed while operating in a third power mode. The third amount of information may be a subset of the second amount of information where the third amount of information is selected from the second amount of information based upon relevancy parameters.

A further embodiment of the invention may include a computer program product including at least one computer-readable storage medium having computer-executable program code instructions stored therein. The computer executable program code instructions may include program code instructions for providing for operation in a user interface state that is configured to present a first amount of information with at least a portion of the first amount of information being presented on a display while operating in a first power mode, program code instructions for selecting information from the first amount of information to create a second amount of information that is a subset of the first amount of information, where the second amount of information is selected from the first amount of information based upon relevancy parameters, and providing for display of a second amount of information from the user interface state while operating in a second power mode. The second power mode may be configured to consume less power than the first power mode. The relevancy parameters may be user configured and they may vary depending upon the user interface state. Operation in the second power mode may be caused by a predetermined amount of time elapsing without detection of a user input. A third amount of information may be displayed while operating in a third power mode. The third amount of information may be a subset of the second amount of information where the third amount of information may be selected from the second amount of information based upon relevancy parameters.

BRIEF DESCRIPTION OF THE DRAWING(S)

Having thus described certain example embodiments of the invention in general terms, reference will now be made to the accompanying drawings, which are not necessarily drawn to scale, and wherein:

DETAILED DESCRIPTION

Figure 1:
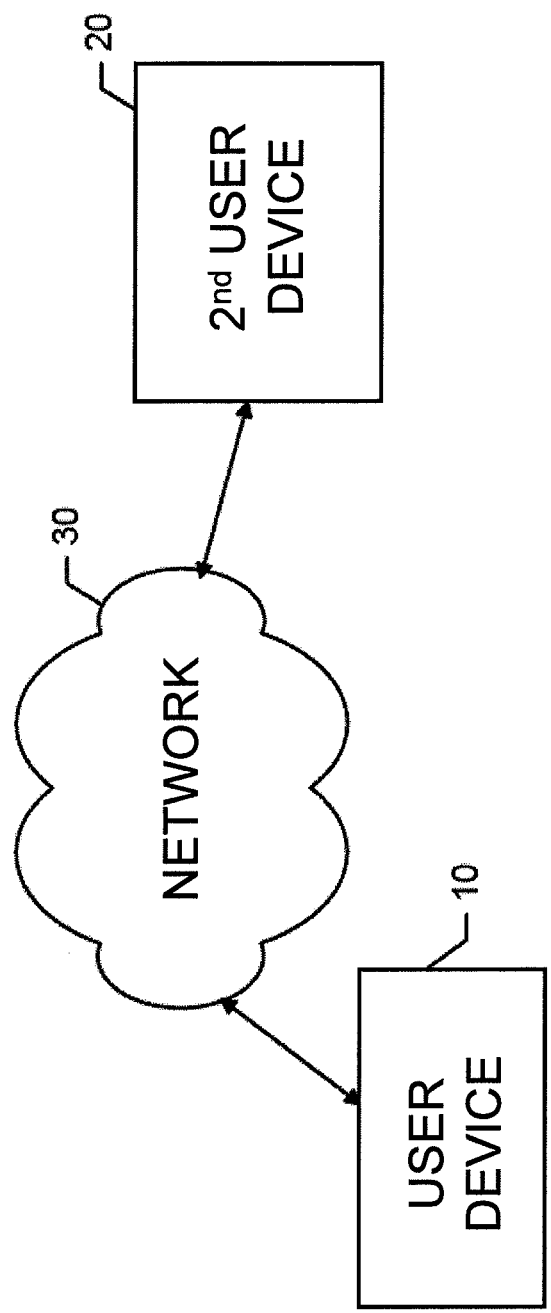
FIG. 1 illustrates an communication system in accordance with an example embodiment of the present invention.

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

A session may be supported by a network 30 as shown in FIG. 1 that may include a collection of various different nodes, devices or functions that may be in communication with each other via corresponding wired and/or wireless interfaces or in ad-hoc networks such as those functioning over Bluetooth® interfaces. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals, such as the mobile terminal 10 and the second mobile terminal 20, may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers or the like) may be coupled to the mobile terminal 10 and the second mobile terminal 20 via the network 30. By directly or indirectly connecting the mobile terminal 10 and the second mobile terminal 20 and other devices to the network 30, the mobile terminal 10 and the second mobile terminal 20 may be enabled to communicate with the other devices or each other, for example, according to numerous communication protocols including Hypertext Transfer Protocol (HTTP) and/or the like, to thereby carry out various communication or other functions of the mobile terminal 10 and the second mobile terminal 20, respectively.

In example embodiments, either of the mobile terminals may be mobile or fixed communication devices. Thus, for example, the mobile terminal 10 and the second mobile terminal 20 could be, or be substituted by, any of personal computers (PCs), personal digital assistants (PDAs), wireless telephones, desktop computers, laptop computers, mobile computers, cameras, video recorders, audio/video players, positioning devices, game devices, television devices, radio devices, or various other devices or combinations thereof.

Figure 2:
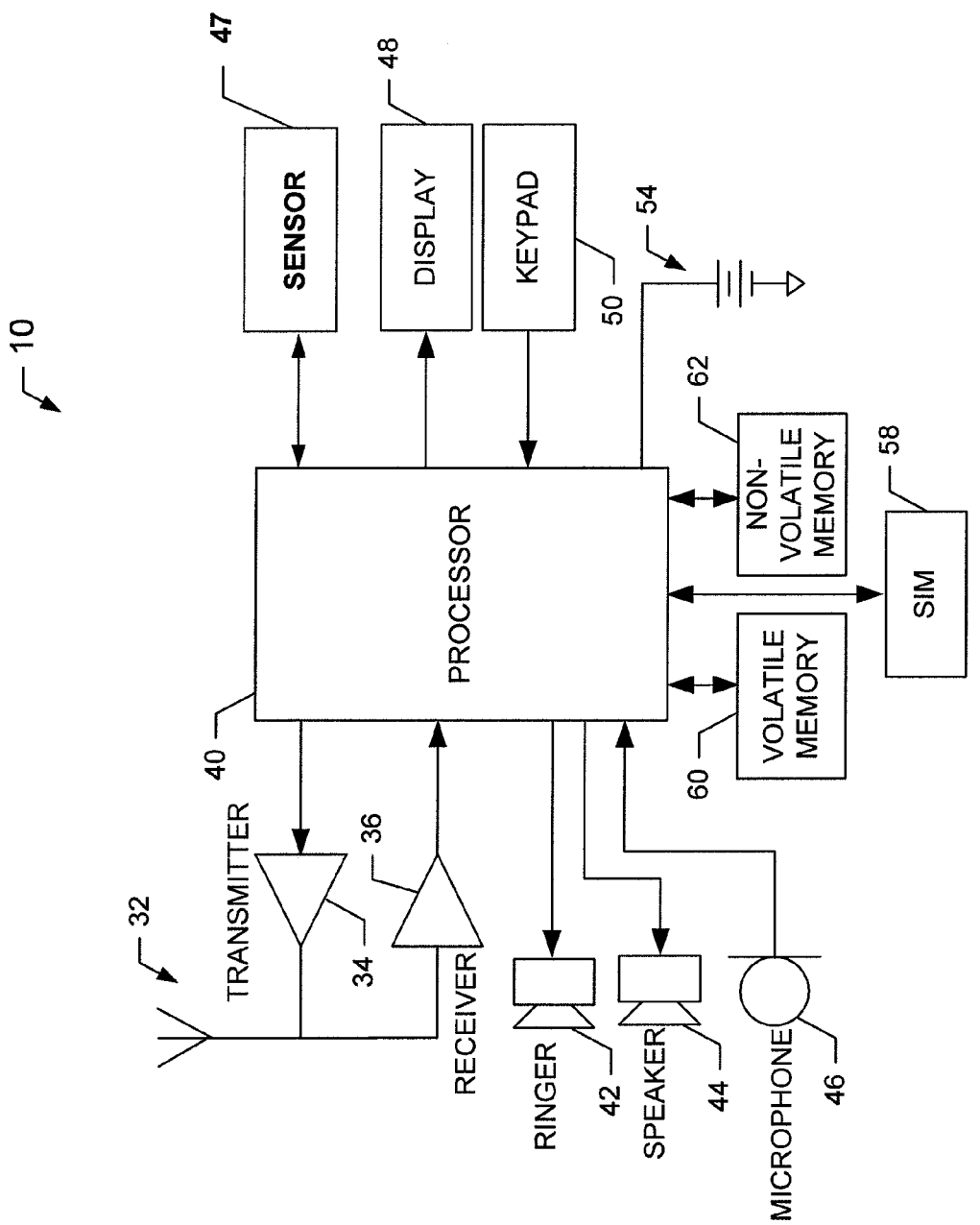
FIG. 2 is a schematic block diagram of a mobile device according to an example embodiment of the present invention.

Although the mobile terminal 10 may be configured in various manners, one example of a mobile terminal that could benefit from an example embodiment of the invention is depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ an example embodiment of the present invention. As described, the mobile terminal may include various means for performing one or more functions in accordance with an example embodiment of the present invention, including those more particularly shown and described herein. It should be understood, however, that a mobile terminal may include alternative means for performing one or more like functions, without departing from the spirit and scope of the present invention.

The mobile terminal 10 illustrated in FIG. 2 may include an antenna 32 (or multiple antennas) in operable communication with a transmitter 34 and a receiver 36. The mobile terminal may further include an apparatus, such as a processor 40, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM (Global System for Mobile Communications) and IS-95, or with third-generation (3G) wireless communication protocols, such as UMTS (Universal Mobile Telecommunications System), CDMA (Code Division Multiple Access) 2000, wideband CDMA (WCDMA) and time division-synchronous CDMA (TD-SCDMA), with 3.9G wireless communication protocols such as E-UTRAN (evolved-UMTS (Universal Mobile Telecommunications System) terrestrial radio access network), with fourth-generation (4G) wireless communication protocols or the like.

It is understood that the apparatus, such as the processor 40, may include circuitry implementing, among others, audio and logic functions of the mobile terminal 10. The processor 40 may be embodied in a number of different ways. For example, the processor 40 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 40 may include one or more processing cores configured to perform independently. A multi-core processor may enable multiprocessing within a single physical package. Additionally or alternatively, the processor 40 may include one or more processors configured in tandem via the bus to enable independent execution of instructions, pipelining and/or multithreading.

In an example embodiment, the processor 40 may be configured to execute instructions stored in the memory device 62 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal or network device) adapted for employing embodiments of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile terminal 10 may also comprise a user interface including an output device such as an earphone or speaker 44, a ringer 42, a microphone 46, a display 48, and a user input interface, which may be coupled to the processor 40. The mobile terminal 10 may further include sensor(s) 47 for detecting a stimulus such as a button for detecting a depression, a touch sensitive display for detecting a touch, or a motion sensor to detect motion, The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 10. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output.

The mobile terminal 10 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, e.g., cell id identity or cell id information, with which the mobile terminal is in communication.

An example embodiment of a communication network in accordance with one example embodiment is presented by FIG. 1. A flowchart illustrating operations performed by or in relation to the network of an example embodiment is presented in the flowchart of FIG. 3. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In an example embodiment, an apparatus for performing the methods of FIG. 3 above may comprise a processor (e.g., the processor 40) configured to perform some or each of the operations (300-315) described below. The processor may, for example, be configured to perform the operations (300-315) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-315 may comprise, for example, the processor 40 and/or a device or circuit for executing instructions or executing an algorithm for processing information as described further below.

A low power mode as described herein with reference to a display (e.g., display 48) which may include a user interface is a mode in which the display is configured to have a lower power consumption than when the display operates in a normal power mode. The low power mode may disable a portion of the display, or it may disable certain pixels or pixel rows of the display or it may reduce or turn off a backlight for the display. Optionally, the refresh rate of display might be changed to be longer. In the case of light emitting diode (LED) or organic light emitting diode (OLED) displays, the low power mode may include a display background where the LED/OLED pixels are turned off and information is displayed with LED/OLED pixels that are operating at less than their normal brightness. Further, the color presented in a low power mode may influence the power consumption as a white color may require more power to display than a red color. Embodiments of the present invention may include multiple low power modes with varying levels of power consumption, each mode potentially presenting different amounts and different levels of information dependent upon the desired power consumption.

In general, example embodiments of the present invention provide for a method for presenting information to a user of a mobile terminal 10 while operating in a low or reduced power mode. Displays 48 of mobile terminals 10 may have large power consumption requirements from the battery 54 or wired power source when the display is presenting information to a user during the use of an application or function of the mobile terminal. However, when the mobile terminal is not in use, the display may operate in a low power mode to conserve battery life and extend the operating time of the mobile terminal. During low power mode, it may be desirable for a user to be able to view select information or reference information on the mobile terminal. To view or reference the desired information, the user may not wish to disable the low power mode and activate a normal power mode on the display as frequent referencing of the desired information may reduce battery life of the mobile terminal 10. As such, it may be desirable to present select information during the low power mode. A user may exit the low power mode when necessary and return to the normal power mode by entering a user input. The user input may be a key sequence, the depression of a key or keys for a prolonged period, removal of the mobile terminal from a cradle or holster, a particular motion of the mobile terminal, hand gesture, voice command or any number of other possible methods.

Different applications and programs (referred to herein as User Interface states or UI states) that can be executed by a mobile terminal 10 may present various assortments of information to a user of the mobile terminal. For example, a user interface state displaying an email system may present a list of new or most recent emails. A user interface state that is a map application may present a present location of the mobile terminal on a map. A user interface state including a music player application may present information about the music playing or to be played and any art from the album that the music belongs to. Each of these examples may present information that causes the display to draw considerable power resources when the display is operating in a normal power mode. When the display reverts to a low power mode (for example, after an elapsed time of inactivity or when the mobile terminal receives a command to enter low power mode), a user may still wish for some information from the active UI state to continue to be displayed. As displays 48 of mobile terminals 10 are capable of displaying vast amounts of information when they are operating under normal power modes, it may be desirable to have an automated method of selecting the most important, critical, or relevant information from the information available for presentation during a low power mode.

Embodiments of the present invention provide for a method of selecting the most important content displayed in an active UI state during a normal power mode to be displayed in a low power mode. The process of determining the most important content to be displayed during a low power mode may be performed by a processing device, such as processor 40, which determines the importance of data based upon a number of possible relevancy parameters. The relevancy parameters used to determine which information is the most important may be dependent upon the active UI state. For example, if an email program is the active UI state on a mobile terminal, the relevancy parameters used to determine importance of information may include how recently a message was received, the contact from whom the message came (e.g., a known contact from a contact list or an unknown sender), the size of the message file, or if the message was a reply to a previously sent message. When a different UI state is active, such as a mapping application, the relevancy parameters may include how recently the mobile terminal position has changed, whether the mobile terminal is following or deviating from a mapped course, distance to points of interest, next turn, etc. Any information available in a UI state may be configured to be a relevancy parameter used to determine the importance of the information available and whether or not the information is to be displayed in a low power mode. A user of the mobile terminal 10 may be able to configure the relevancy parameters deemed most important such that the most important information displayed during a low power mode is determined based upon user defined relevancy parameters. Such user-configurable parameters may include news ticker headlines, stock quotes, etc. Other relevancy parameters (which may or may not be user configurable) may be used by the processor 40 to determine the importance of information and the processor may determine, based upon the importance, whether the information is to be displayed during a low power mode. An additional parameter that may be used by the mobile terminal to determine the information to display may include battery life or a level of power consumption selected by a user (e.g., normal use, conservative use, extended use) where the mobile terminal operates according to a set of rules associated with each level of power consumption.

A further example embodiment of determining the most important content to be displayed during a low power mode may include a determination made by the processing device, such as processor 40, as to which UI state is actively being viewed or was viewed most recently on the display. Such a determination may be necessary when multiple UI states are active (e.g., a music player UI state operating in the background while a messaging UI is at the forefront of the display). The processor may determine that the UI state that is in the foreground is the most relevant and display the most relevant information from that UI state. Optionally, multiple UI states may be in the foreground of a display with one UI state being predominant by occupying more space on the display an another UI state. The UI state occupying the most space may be determined to be the most relevant such that only information from that particular UI state may be presented in a low power mode. Optionally, with multiple UI states active, regardless of whether they are in the foreground of the display, the processor may determine that some or all of them include information that is considered important such that in a low power mode, an amalgamation of important information is displayed from the plurality of UI states.

Figure 3:
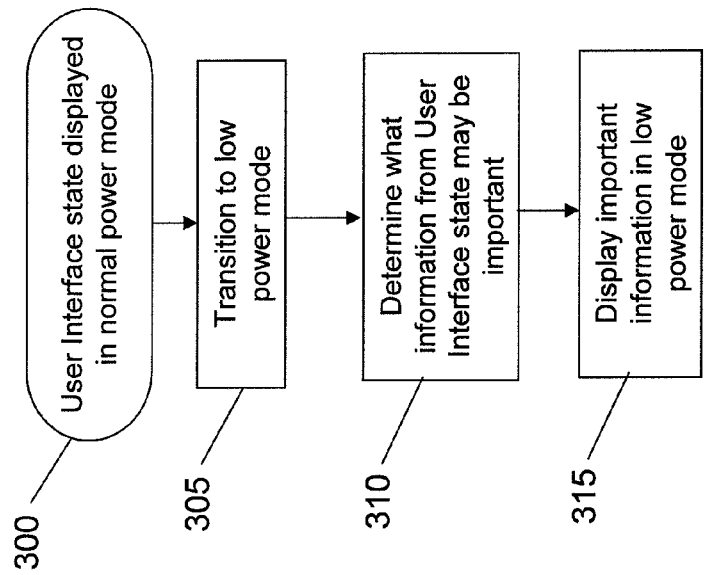
FIG. 3 is a flow chart of a method of operating a mobile terminal according to an example embodiment of the present invention.

FIG. 3 illustrates a flowchart of a method of operating a mobile terminal according to an example embodiment of the present invention. A user interface state is displayed in normal power mode on a display, such as display 48 of FIG. 2. At 305, the mobile terminal may transition to a low power mode. At 310 the information deemed important from the user interface state may be determined. Optionally, the determination of the most important or relevant information may occur before the transition to low power mode. At 315, the information deemed most important or relevant is presented on the display in the low power mode.

Figure 4:
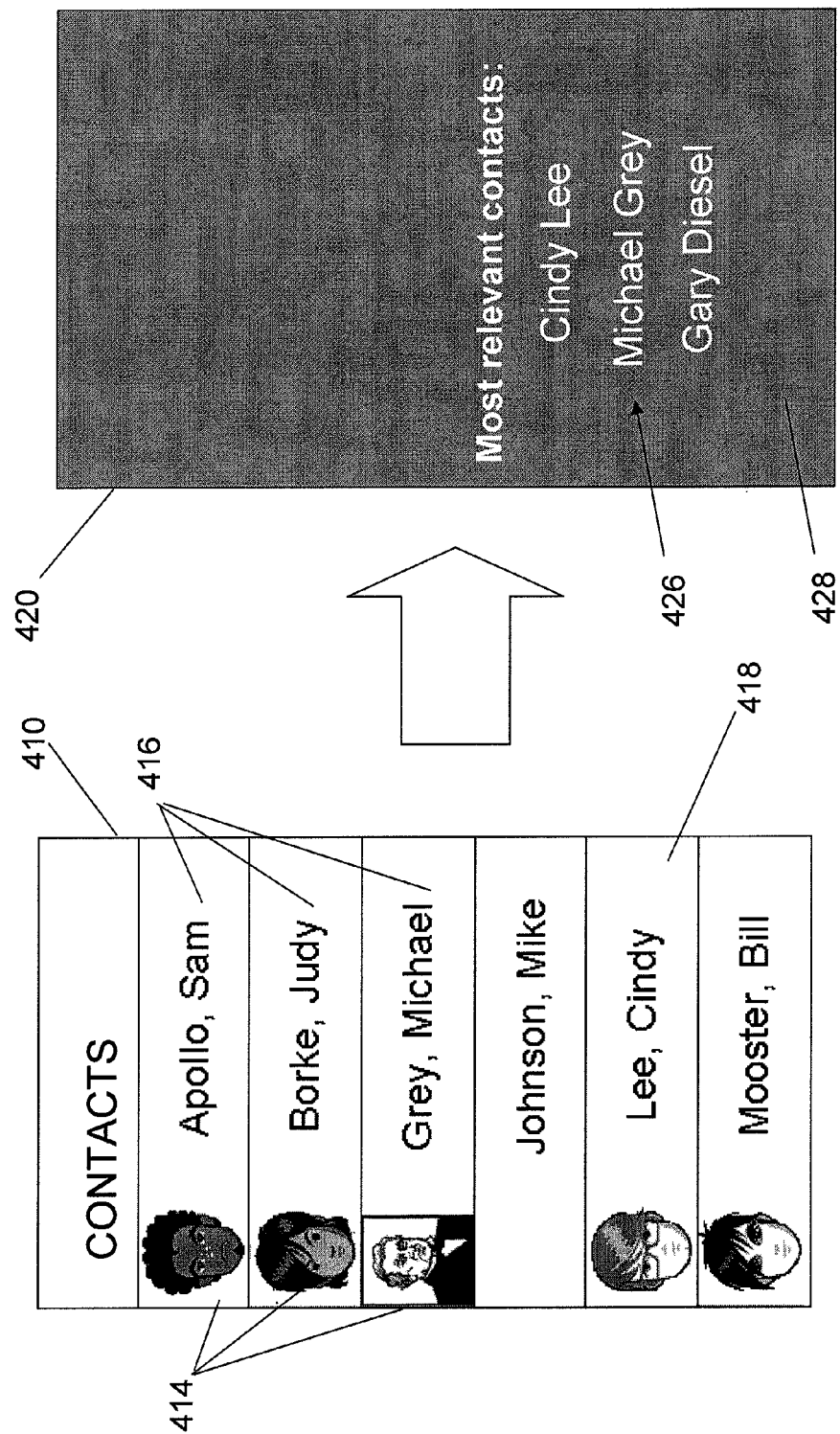
FIG. 4 illustrates a display of a mobile terminal according to an example embodiment of the present invention.

An example embodiment of the present invention is illustrated in FIG. 4 which depicts the display 410, 420 of a mobile terminal operating in both a normal power mode 410 and a low power mode 420. The depicted embodiment of the display in the normal power mode 410 illustrates a User Interface state with a contact list open. If the user allows the mobile terminal, or directs the mobile terminal to enter low power mode, the mobile terminal may then determine which information from the list of contacts is the most important or relevant information to display during the low power mode 420. The processor may determine that there are three important contacts that should be presented on the display during the low power mode 420 such that each of these three contact names is presented. The contact names may be arranged alphabetically or by importance as determined by the processor. The normal power mode display 410 may present the contact list with thumbnail images 414 of the contacts 416 and a white or illuminated background 418 to provide an easily read list. As the background 418 requires either a backlight with an LCD display or the illumination of LED pixels in an LED or OLED display, the display operating in normal power mode 410 may have relatively large power requirements. In contrast, the display operating in low power mode 420 depicts a background 428 substantially devoid of color or light such that the background does not require an LCD display backlight to be illuminated, nor do the LED pixels of an LED or OLED display have to be illuminated. The most relevant contacts 426 are displayed in a color that contrasts with the background, but require very few LED pixels to be illuminated in an LED or OLED display embodiment, or possibly precludes the necessity of a backlight in an LCD display.

Figure 5:
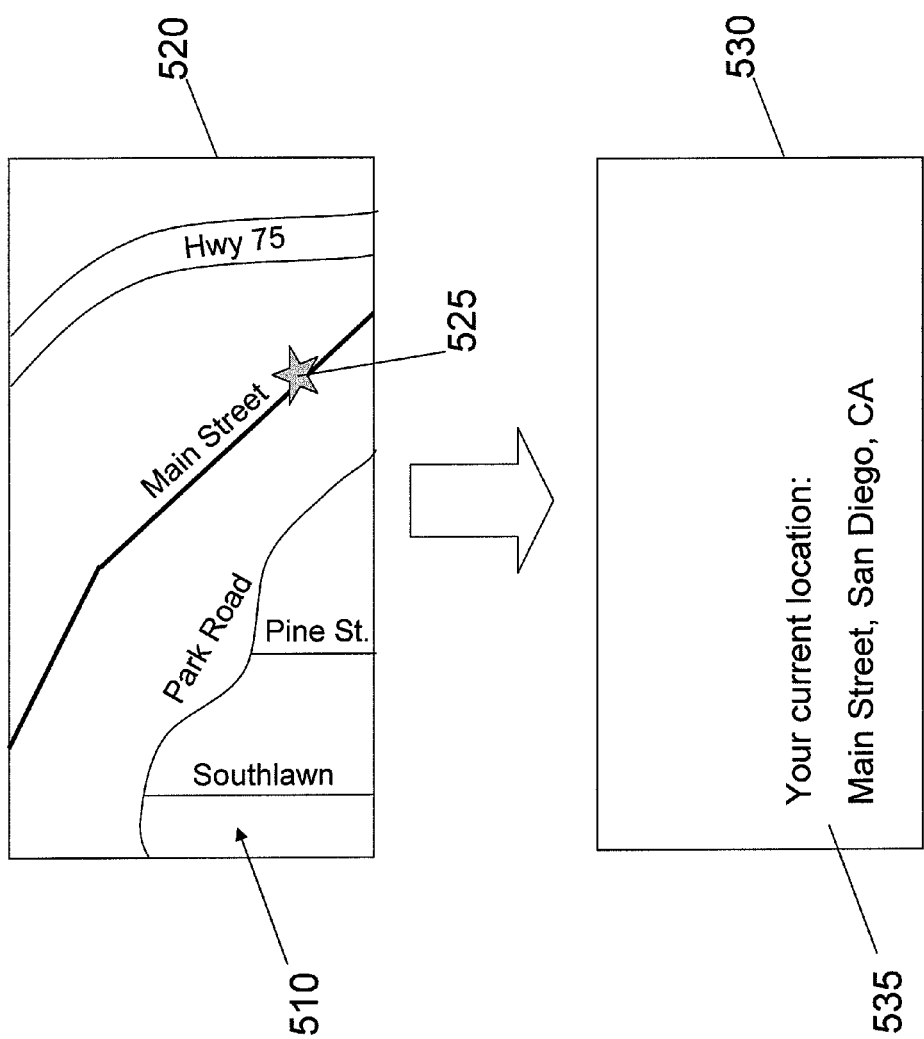
FIG. 5 illustrates a display of a mobile terminal according to another example embodiment of the present invention.

Another example embodiment of the present invention is illustrated in FIG. 5 which depicts a map 510 as presented on the display 520 of a mobile terminal during normal power mode, such as the display 48 of mobile terminal 10 of FIG. 2. In the depicted embodiment, the map 510 illustrates detailed graphical information regarding the current location 525 of the mobile terminal. When the mobile terminal enters a low power mode, either by a time elapsing since the last input was received or a user instructed the device to enter low power mode, the display may cease to show the graphic detail of the map 510. In low power mode, the display 530 may show only a textual representation 535 of the current location of the mobile terminal. If the display is an LED or OLED display, the textual representation 535 may be the only pixels illuminated during low power mode such that significantly less power is consumed during the low power mode operation.

Figure 6:
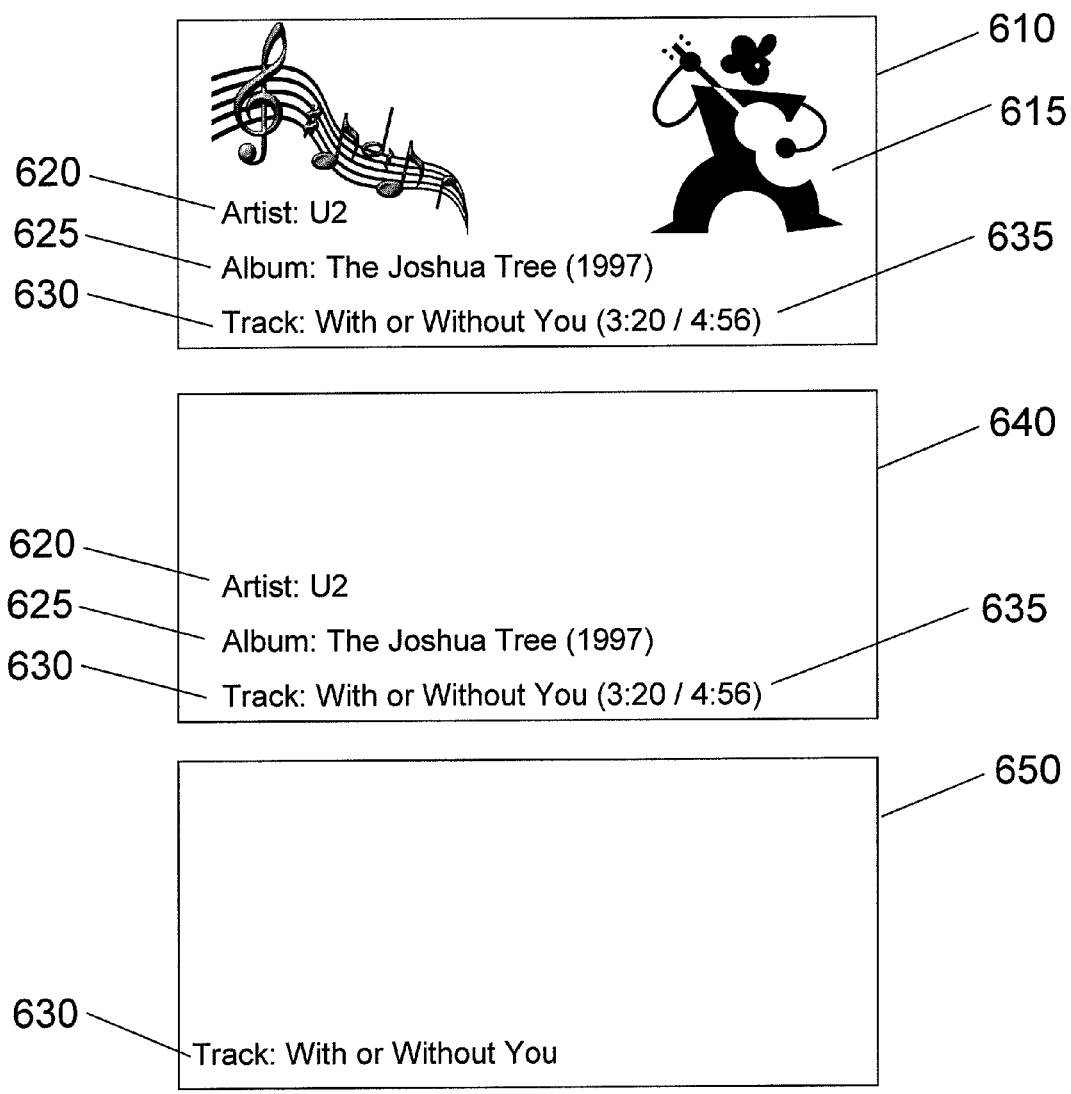
FIG. 6 illustrates a display of a mobile terminal according to yet another example embodiment of the present invention.

Still another example embodiment of the present invention is illustrated in FIG. 6 which depicts a music player user interface state displayed in normal power mode 610 and including extensive information about a music track that is playing. The information includes graphics 615, artist 620, album name 625, track name 630, and elapsed time 635. The display 640 depicts the same user interface state operating in low power mode, displaying only the artist 620, album name 625, track name 630, and elapsed time 635. The display 640 operating in the low power mode may have a background devoid of light and color to reduce power consumption such that the only illuminated portion of the display is the text information regarding the currently playing track. Display 650 depicts a lower power mode which is configured to consume less power than the low power mode display 640 by reducing the information presented on the display 650. In the lower power mode, only the track name 630 is displayed. An example of a mobile terminal operating according to the embodiment of FIG. 6 may transition from the first, normal power mode 610 to a second, low power mode 640 after an elapsed period of time without receiving a user input. The mobile terminal may transition from the second, low power mode 640 to a third, lower power mode 650 in response to a longer elapsed period of time without receiving a user input. The second or third modes may also be achieved by receiving a user input directing the mobile terminal to operate in the second or third modes. Further, operation in the second or third modes may be influenced by the power consumption level selected by the user as described above or by the remaining battery life.

A user interface state may be considered "active" when it is the application that substantially occupies the display 48 of a mobile terminal 10. Optionally, a mobile terminal may have multiple active user interface states operating concurrently. When more than one active UI state is present, the mobile terminal may use a hierarchy of UI states to determine the most important UI state from which information is to be displayed. The hierarchy may be user configurable based upon what UI state a user believes to be the most important. Additionally, the most important information from multiple active UI states may be displayed in a low power mode in embodiments where relevancy parameters, as described above, may be used to determine which information from which UI states may be the most important and thus displayed in the low power mode.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the tangible, non-transitory storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and associated drawings describe example embodiments in the context of certain example combinations of elements and/or functions, it should be appreciated that different combinations of elements and/or functions may be provided by alternative embodiments without departing from the spirit and scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   providing for operation in a user interface state that is configured to present a first amount of information with at least a portion of the first amount of information being presented on a display while operating in a first power mode;
   selecting information from the first amount of information to create a second amount of information that is a subset of the first amount of information, wherein the second amount of information is selected from the first amount of information based upon relevancy parameters;
   providing for display of the second amount of information while operating in a second power mode that is different than the first power mode; and
   proving for display of a third amount of information from the user interface state while operating in a third power mode, wherein the third amount of information is a subset of the second amount of information, and wherein the third amount of information is selected from the second amount of information based upon relevancy parameters.

2. The method according to claim 1, wherein the second power mode is configured to consume less power than the first power mode.

3. The method according to claim 1, wherein the relevancy parameters are configurable by a user.

4. The method according to claim 1, wherein the relevancy parameters vary depending upon the user interface state.

5. The method according to claim 1, wherein operating in the second power mode is caused by a predetermined amount of time elapsing without detection of a user input.

6. An apparatus comprising at least one processor and at least one memory including computer program code, the at least one memory and the computer program code configured to, with the at least one processor, cause the apparatus to perform:
   provide for operation in a user interface state that is configured to present a first amount of information with at least a portion of the first amount of information being presented on a display while operating in a first power mode;
   provide for selection of information from the first amount of information to create a second amount of information that is a subset of the first amount of information, wherein the second amount of information is selected from the first amount of information based upon relevancy parameters;
   provide for display of the second amount of information from the user interface state while operating in a second power mode; and
   provide for display of a third amount of information from the user interface state while operating in a third power mode, wherein the third amount of information is a subset of the second amount of information, and wherein the third amount of information is selected from the second amount of information based upon relevancy parameters.

7. The apparatus according to claim 6, wherein the second power mode is configured to consume less power than the first power mode.

8. The apparatus according to claim 6, wherein the relevancy parameters are configurable by a user.

9. The apparatus according to claim 6, wherein the relevancy parameters vary depending upon the user interface state.

10. The apparatus according to claim 6, wherein operating in the second power mode is caused by a predetermined amount of time elapsing without detection of a user input.

11. A computer program product comprising at least one non-transitory computer-readable storage medium having computer-executable program code instructions stored therein, the computer-executable program code instructions comprising:
    program code instructions for providing for operation in a user interface state that is configured to present a first amount of information with at least a portion of the first amount of information being presented on a display while operating in a first power mode;
    program code instructions for selecting information from the first amount of information to create a second amount of information that is a subset of the first amount of information, wherein the second amount of information is selected from the first amount of information based upon relevancy parameters;
    program code instructions for providing for display of the second amount of information from the user interface state while operating in a second power mode; and program code instructions for providing for display of a third amount of information from the user interface state while operating in a third power mode, wherein the third amount of information is a subset of the second amount of information and wherein the third amount of information is selected from the second amount of information based upon relevancy parameters.

12. The computer program product according to claim 11, wherein the second power mode is configured to consume less power than the first power mode.

13. The computer program product according to claim 11, wherein the relevancy parameters vary depending upon the user interface state.

14. The computer program product according to claim 11, wherein operating in the second power mode is caused by a predetermined amount of time elapsing without detection of a user input.

* * * * *

UNITED STATES PATENT AND TRADEMARK OFFICE
CERTIFICATE OF CORRECTION

PATENT NO. : 8,751,838 B2  Page 1 of 1
APPLICATION NO. : 12/861562
DATED : June 10, 2014
INVENTOR(S) : Nurmi It is certified that error appears in the above-identified patent and that said Letters Patent is hereby corrected as shown below:

In the claims:

Column 11,
Line 61, Claim 1, "proving for display" should read --providing for display--.

Signed and Sealed this
Thirtieth Day of September, 2014

Michelle K. Lee
*Deputy Director of the United States Patent and Trademark Office*